(12) United States Patent
Farrell et al.

(10) Patent No.: US 8,234,662 B2
(45) Date of Patent: Jul. 31, 2012

(54) APPARATUS AND SYSTEM FOR PRODUCING ATOM FEEDS WITH J2CA ADAPTERS

(75) Inventors: Joel A. Farrell, Ashland, MA (US); Travis Nelson, San Jose, CA (US); Piotr Przybylski, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 12/129,450

(22) Filed: May 29, 2008

(65) Prior Publication Data

US 2009/0300663 A1 Dec. 3, 2009

(51) Int. Cl.
*G06F 9/44* (2006.01)
*G06F 17/30* (2006.01)
(52) U.S. Cl. ............................ 719/328; 707/705
(58) Field of Classification Search .............. 707/705; 719/328
See application file for complete search history.

(56) References Cited

U.S. PATENT DOCUMENTS 7,600,002 B2 * 10/2009 Pavlik et al. ................. 709/219

OTHER PUBLICATIONS

Samper et al. "NectaRSS, an intelligent RSS feed reader" Feb. 2007 ScienceDirect pp. 1-14.*
Atom (standard), from Wikipedia, the free encyclopedia, http://en.wikipedia.org/wiki/Atom_%28standard%29, Mar. 31, 2008.
Nelson, Travis, "Extending a J2CA Adapter for Use With WebSphere Process Server and WebSphere Enterprise Service Bus", http://www-128.ibm.com/developerworks/library/ws-soa-j2caadapter/index.html?ca=drs, Mar. 24, 2006.

* cited by examiner

*Primary Examiner* — Charles E Anya
(74) *Attorney, Agent, or Firm* — Kunzler Needham Massey & Thorpe

(57) ABSTRACT

A servlet for enabling communications between a client having an Atom feed reader and an Enterprise Information System (EIS). The servlet enables communications between the client and the EIS by acting as a proxy for an J2CA resource adapter deployed on an application server. The servlet receives HTTP requests from the Atom feed reader and translates those requests into appropriate adapter function calls based on the specified HTTP function and the provided key information. The servlet then invokes the appropriate functions and receives the response from the adapter. If a single object is returned by the adapter, the servlet translates the object into Atom-compliant XML and transmits it to the Atom feed reader as the response. If multiple objects are returned, the servlet generates a list of URLs which uniquely specify and identify each object returned by the adapter and provides this list to the Atom feed reader.

8 Claims, 2 Drawing Sheets

APPARATUS AND SYSTEM FOR PRODUCING ATOM FEEDS WITH J2CA ADAPTERS

BACKGROUND OF THE INVENTION

1. Field of the Invention

The invention relates to generating web-based access to data in a data store. More specifically, the invention relates to generating ATOM feeds using J2CA adapters which provide access to data in an Enterprise Information System.

2. Description of the Related Art

As the internet matures, increasing emphasis is placed on using the World Wide Web as a platform for development and information sharing, a phenomenon commonly referred to as "Web 2.0." One tool that has been increasing in popularity and use is the Atom standard. Atom was initially developed as an alternative to the Really Simple Syndication (RSS) standard. Generally, developers have primarily used Atom for web feeds that allow software programs, generally referred to as Atom feed readers, to check for updates to web content.

However, developers are discovering uses for Atom outside the typical blog/website syndication environment. For example, web service providers are using Atom feeds in combination with REST-based protocols to share information, effectively providing a lighter-weight solution than other alternatives such as SOAP. An additional benefit of this approach is that developers can combine web services to create dynamic "mash-ups" which combine information from a variety of disparate sources to provide new and often more meaningful presentations of data.

For enterprises with significant amounts of data in an Enterprise Information System (EIS), however, this may pose a daunting task. In order to provide Atom feed access to data or information stored in the EIS, programmers need to develop web services or Atom feed producing applications on top of the EIS. This task represents a complicated, costly, and difficult programming challenge and may dissuade many entities from taking full advantage of the opportunities available through Atom feed access to data. Accordingly, a need exists for an apparatus and system for producing Atom feed access to data in an EIS.

SUMMARY OF THE INVENTION

The present invention has been developed in response to the present state of the art, and in particular, in response to the need to provide a flexible and adaptable interface to EIS data for Atom feed readers.

In one embodiment, the present invention includes a servlet configured to run within an Application Server operating on a processor and memory. The Application Server includes a J2EE Connector Architecture (J2CA) adapter configured to communicate with a particular EIS. The servlet enables Atom feed access to the EIS through the J2CA adapter.

The servlet includes an Atom request module that receives from an Atom feed reader a URL including an HTTP function call, an object category/identifier, and key information. The key information is generally a key value, a search parameter set, or a null key value (such as no key information).

The servlet also includes a function translation module that associates the HTTP function calls and key combinations with J2CA adapter functions. For example, the function translation module associates a GET HTTP function call with the J2CA adapter's Retrieve function call when the key information is a key value. The function translation module associates a GET HTTP function call with the J2CA adapter's RetrieveALL function call when the key information is a search parameter set or a null key value.

The function translation module associates a POST HTTP function call with the J2CA adapter's Create function call when the key information is a key value, and similarly associates a PUT HTTP function call with the J2CA adapter's Update function call when the key information is a key value. The function translation module also associates a DELETE HTTP function call with the J2CA adapter's Delete function call when the key information is a key value.

An execution module of the servlet invokes the J2CA adapter function call associated with the HTTP function by the function translation module such that the J2CA adapter executes the associated J2CA adapter function call on the one or more objects in the EIS having the specified object category and satisfying the key information.

The servlet also includes a response module that receives from the J2CA adapter one or more EIS objects and that translates them into an Atom-compliant XML response. The response module communicates this response to the Atom feed reader using the HTTP protocol. Where the response module receives multiple EIS objects from the adapter, it generates URLs for each object. These URLs correspond to an HTTP GET function call and identify the particular EIS object through a key value. These URLs are translated into Atom-compliant XML and communicated to the Atom feed reader. Where the response module receives a single EIS object, the response module generates an Atom-compliant XML object and communicates this object to the Atom feed reader.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
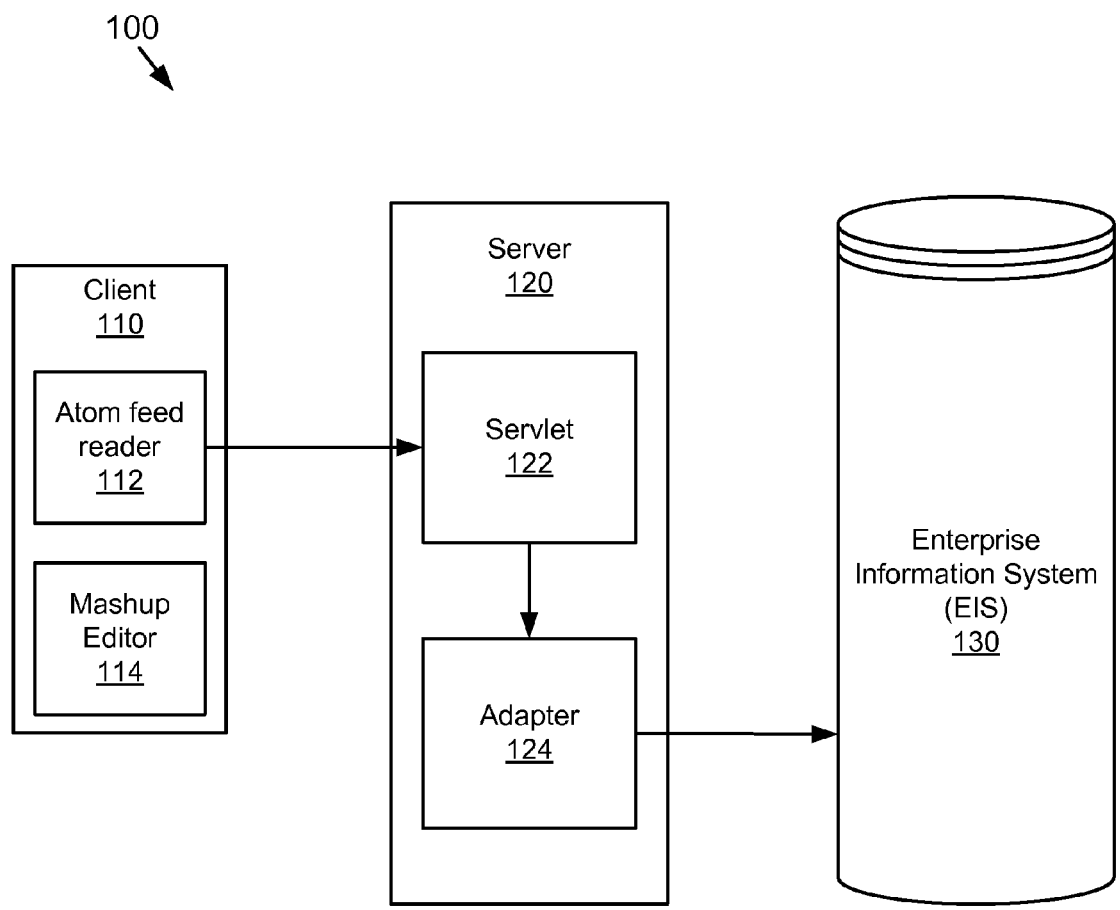
FIG. 1 is a schematic block diagram illustrating a system for producing Atom feeds using J2CA adapters in a web server.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a system 100 for producing Atom feeds using adapters on a server 120 that can access an EIS 130. The system comprises a client 110, a server 120, and an enterprise information system (EIS) 130. Those of skill in the art will appreciate that the EIS 130 is generally a computing system of enterprise class and deals with large volumes of data. The EIS 130 provides a central data repository and may be implemented in one or more data centers. The EIS 130 typically runs Enterprise software. For example, the EIS 130 may run IBM's DB2 solution.

The client 110 may be any variety of computing platforms which are capable of communicating with a server 120 over a network. The client 110 may also have an Atom feed reader 112. In a typical embodiment, the Atom feed reader 112 sends requests by providing a URL that specifies the necessary information and operations. The Atom feed reader 112 expects responses to its requests in Atom-compliant XML communicated using the HTTP protocol.

The client 110 may also include a mashup editor 114 configured to allow a developer or other user to generate applications that combine data from multiple sources. Those of skill in the art will appreciate that the mashup editor 114 typically derives content from third parties through web services or other public interfaces. Those of skill in the art will further appreciate that the Atom feed reader 112 is an example of an entity that supplies data to the mashup editor 114 and ultimately to the web application developed using the mashup editor 114.

The server 120 may be a web server or application server such IBM's WebSphere server. The server 120 comprises a servlet 122, discussed in more detail below, and an adapter 124. In the system 100, the server facilitates the data exchange between the client 110 and the EIS 130.

The server 120 further comprises an adapter 124. In one embodiment, this adapter 124 is a J2CA resource adapter which implements the Common Client Interface (CCI). The adapter 124 may communicate using the Service Data Object (SDO) format, JavaBeans or other formats known to those in the art. Those of skill in the art will appreciate that while this specification makes reference to the adapter 124 being a J2CA resource adapter communicating using SDO, this is simply one exemplary embodiment of a number of adapters and formats that could be used. The adapter 124 enables a variety of J2EE-compliant components to make requests of the adapter 124 to perform a variety of operations on the EIS. The adapter 124 can translate these requests such that the requested actions are performed on data in the EIS 130.

The adapter 124 implements a set of standard functions, including RetrieveALL, Retrieve, Create, Delete, and Update. When a client of the adapter 124 invokes the RetrieveALL function, the adapter 124 retrieves all objects of a particular specified type. The client may further specify search criteria in which it identifies particular fields of the object and the desired values. The adapter 124 then searches for objects in the EIS 130 that meet the search criteria and returns them.

When a client of the adapter 124 invokes the Retrieve function, the adapter 124 retrieves a single object of the specified type based on a provided key value. Similarly, invocation of the Create function causes the adapter 124 to create an object in the EIS as specified by the client. The client may choose to supply a key for this object, of the key may be automatically generated by the adapter 124. The Delete function causes the adapter 124 to delete an object from the EIS based on the key provided to the adapter 124. The Update function causes the adapter 124 to update one or more values in an object in the EIS 130.

However, as noted above, the adapter 124 is incapable of interpreting the URL provided by the Atom feed reader 112. Conversely, the Atom feed reader 112 is incapable of interpreting the SDO format provided by the adapter 124.

The servlet 122 provides the necessary functionality to enable the Atom feed reader 112 to communicate with the EIS 130 by way of the adapter 124. As a result, the servlet 122 provides the Atom feed reader 112 with access to the EIS 130 which can then be used in a variety of applications.

Figure 2:
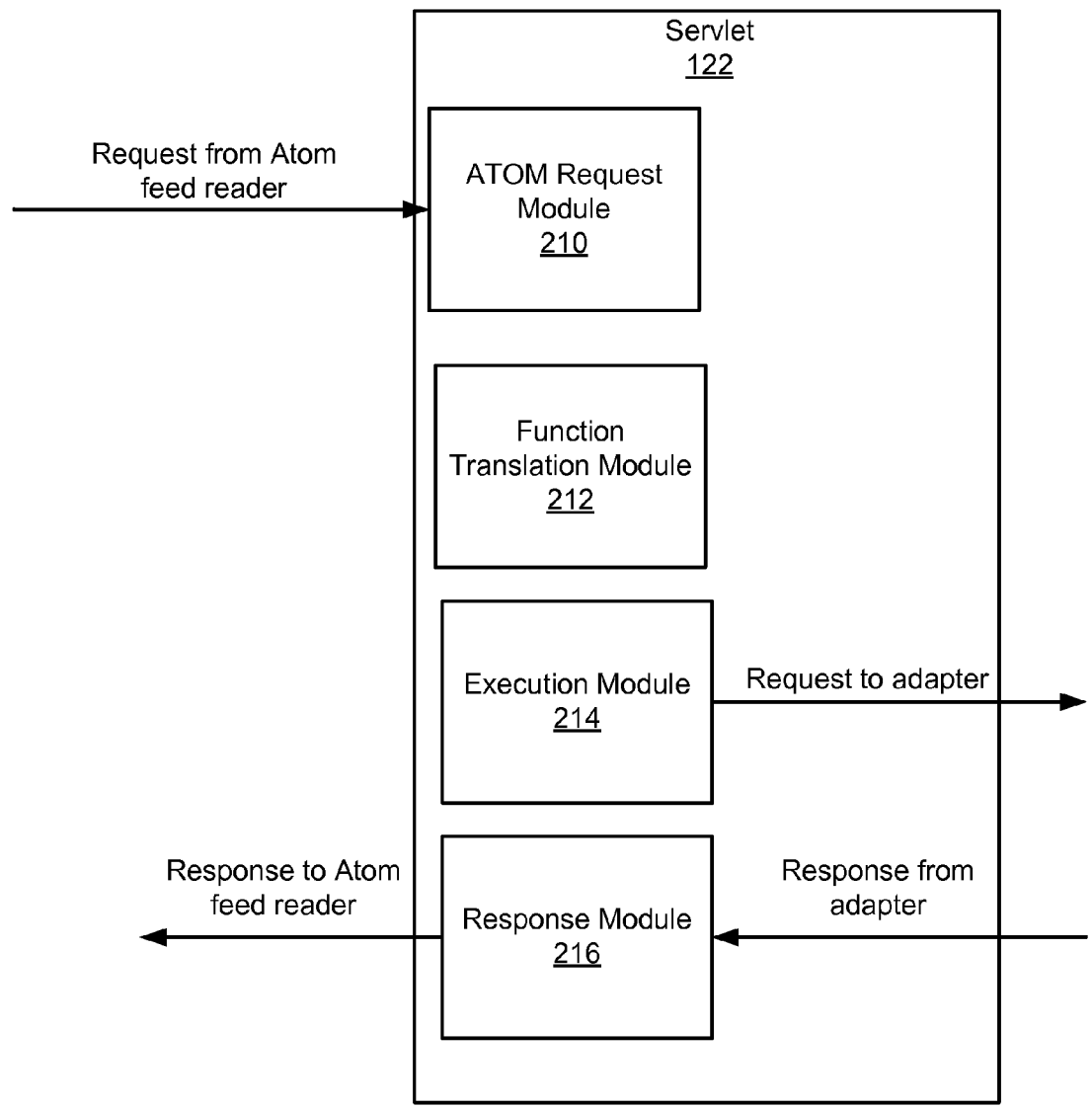
FIG. 2 is a schematic block diagram illustrating one embodiment of a servlet for producing Atom feeds using J2CA adapters.

FIG. 2 presents a schematic block diagram of a servlet 122 in accordance with the present invention. The servlet 122 comprises an Atom request module 210, a function translation module 212, an execution module 214, and a response module 216.

The Atom request module 210 is configured to receive a URL from the Atom feed reader 112. The URL provided by the Atom feed reader 112 will generally have an HTTP function call which specifies which operation the Atom feed reader 112 is requesting. The standard HTTP function calls are GET, POST, PUT, DELETE. The URL will further specify an object category. The object category serves to identify the genus of what is being requested from the EIS 130. For example, in Java, a "Customer" class may exist, with instances of the class being Customer objects. The object category serves to specify what is being requested from the EIS 130.

The URL further specifies key information for the request. This may include a key value which uniquely specifies the particular instance being sought. This is particularly useful where the object defines a single primaryKey. The key information may also be search criteria. For example, the key information may specify particular fields of the object to search and the values to be search for. Search criteria may also be used where the object has a composite key. In addition, the key information may be a null key value. The null value may be explicit, but may also be the value given when there is no key or search data provided as part of the URL.

For example, the URL: http://appserver/AtomServlet?ObjectName=Customer,Key=1 specifies an object category of Customer and further specifies that the relevant key value is 1. For a search, the URL may specify instead "searchFields=[name, zip], searchValues=[Joe, 84108]. The Atom request module 210 receives this information from the Atom feed reader 112 and parses out the necessary information to determine the appropriate action for the adapter 124 to take.

The function translation module 212 is configured to associate the information parsed from the URL by the Atom request module 210 with an appropriate action for the adapter 124. The function translation module 212 maps the information as specified in the table below:

| HTTP Function | Key Information | Adapter Function |
| --- | --- | --- |
| GET | Key value | Retrieve |
| GET | Null or search parameter set | RetrieveALL |
| POST | Key value | Create |
| PUT | Key value | Update |
| DELETE | Key value | Delete |

Thus, if the URL contains a GET function call and a particular key value, the function translation module 212 maps the URL to the adapter 124's Retrieve function which executes using the particular key value and the object category specified in the URL. In contrast, if there is no key information, the function translation module 212 maps the URL to the adapter 124's RetrieveALL function such that all objects in the specified object category are retrieved.

The servlet 122 also includes an execution module 214. The execution module 124 is configured to invoke the appropriate adapter function specified by the function translation module 212 and provide to the adapter 124 the necessary information parsed from the URL information by the Atom request module 210. As a result, the servlet 122 effectively parses, translates, and enables communications between the Atom feed reader 112 and the adapter 124, thereby allowing the Atom feed reader 112 to effectively request information from the EIS 130 without requiring the development of a specific adapter or architecture over the EIS 130.

However, as noted above, additional work is necessary to translate information retrieved by the adapter 124, typically communicating using the SDO format, into Atom-compliant XML. As such, the servlet 122 also includes a response module 216 that is configured to receive from the adapter 124 an EIS 130 object and to translate this object into an Atom-compliant XML response. The response module 216 is also configured to communicate this Atom-compliant XML response to the Atom feed reader 112 using the HTTP protocol.

Based on the information returned by the adapter 124, the response module 216 may return either an object represented in XML, or, alternatively, return a link or a set of links to the Atom feed reader 112. Where the adapter 124 returns a single EIS object, the response module 216 generates an XML representation of the object using Atom-defined fields. In one embodiment, this involves translating the SDO object received from the adapter 124 into XML.

The response module 216 uses the Atom-defined content/id field to represent the key of the object, which may be a primary or composite key as necessary. The content/category field specifies the type of the object, while the content/src field contains the XML representation of the object and the content/type field includes the text/XML.

Based on this representation, a mashup editor 114 or other mashup application can understand the nature of the information in the retrieved object and thus use the object and the information therein effectively. To facilitate this use, the adapter 124 may place metadata information in the object as an annotation thereto. For example, the adapter 124 may specify an appropriate XML Schema Definition (XSD) in the metadata, which can then be used to facilitate easier manipulation of the data therein.

However, where more than one object is returned to the response module 216 from the adapter 124, a different approach may be used. For example, if the execution module 214 invokes the RetrieveALL function of the adapter 124, one would reasonably expect a plurality of objects in return. Rather than generate one XML representation per object, as discussed above, the response module 216 generates a plurality of URLs that include an HTTP GET function call and the particular key values for each of the objects provided by the adapter 124. These URLs are then sent as an Atom-compliant XML response to the Atom feed reader 112.

For example, the response module 216 may use the content/id Atom-defined field to specify the key of the particular object, the content/category field to specify the type of object, and the content/link field to place the generated URL of the Atom feed that represents a Retrieve for the particular object returned by the adapter 124.

The Atom feed reader 112 receives this Atom-compliant XML response containing the links described above, and then presents this information to a user. When the user selects a link to a particular object from the list, the Atom feed reader 112 sends the associated URL, which is a pre-packaged GET request specifying the particular object selected, and the request is fulfilled by the servlet 122 in combination with the adapter 124 as described above. Thus, the user is able to take advantage of the browse and drill-down approach to retrieving data from the EIS 130 through the Atom feed reader 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A servlet configured to run within an application server operating on a processor and memory, the Application Server further comprising a J2EE (Java 2 Enterprise Edition) Connector Architecture (J2CA) adapter configured to communicate with an Enterprise Information System (EIS), the servlet configured to enable Atom feed access to the EIS through the J2CA adapter, the servlet comprising:
   an Atom request module configured to receive from an Atom feed reader a URL (Universal Resource Locator) corresponding to an HTTP (HyperText Transfer Protocol) function call, an object category, and key information, wherein the key information is one of a key value, a search parameter set, and a null key value;
   a function translation module configured to:
      associate a GET HTTP function call with the J2CA adapter's Retrieve function call in response to the key information comprising the key value;
      associate the GET HTTP function call with the J2CA adapter's RetrieveALL function call in response to the key information being one of the search parameter set and the null key value;
      associate a POST HTTP function call with the J2CA adapter's Create function call in response to the key information comprising the key value;
      associate a PUT HTTP function call with the J2CA adapter's Update function call in response to the key information comprising key value;
      associate a DELETE HTTP function call with the J2CA adapter's Delete function call in response to the key information comprising the key value;
   an execution module configured to invoke the J2CA adapter function call associated with the HTTP function, wherein the J2CA adapter executes the associated J2CA adapter function call on the one or more objects in the EIS having the object category and satisfying the key information; and
   a response module configured to receive from the J2CA adapter an EIS object and to translate the EIS object into an Atom-compliant XML (eXtensible Markup Language) response, wherein the response module further configured to communicate the Atom-compliant XML response to the Atom feed reader using the HTTP protocol.

2. The servlet of claim 1, wherein the response module is further configured to generate a plurality of URLs in response to receiving from the J2CA adapter a plurality of EIS objects, each URL corresponding to an HTTP GET function call to the servlet to retrieve a particular EIS object from the adapter, each URL further comprising a key value associated with a particular EIS object.

3. The servlet of claim 2, wherein the response module is further configured to translate the plurality of URLs into an Atom-compliant XML response and communicate the Atom-compliant XML response to the Atom feed reader.

4. The servlet of claim 1, wherein the response module is further configured to generate an Atom-compliant XML object in response to receiving from the adapter a single EIS object, the response module further configured to communicate the Atom-compliant XML object to the Atom feed reader.

5. A system for enabling Atom feed access to an Enterprise Information System (EIS), the system comprising:
   a client system comprising a processor, memory, an Atom feed reader, and a mashup editor; and
   an Application Server comprising a processor and memory in communication with the client system, the application server further comprising:
      a (J2EE Connector Architecture (J2CA) adapter configured to communicate with an Enterprise Information System using Service Data Objects (SDOs), the J2CA adapter implementing the Common Client Interface (CCI);
      a servlet configured to enable Atom feed access to the EIS through the J2CA adapter, the servlet comprising:
         an Atom request module configured to receive from an Atom feed reader a URL (Universal Resource Locator) comprising an HTTP (HyperText Transfer Protocol) function call, an object category, and key information, wherein the key information is one of a key value, a search parameter set, and a null key value;
         a function translation module configured to: associate a GET HTTP function call with the J2CA adapter's Retrieve function call in response to the key information comprising the key value;
         associate the GET HTTP function call with the J2CA adapter's RetrieveALL function call in response to the key information being one of the search parameter set and the null key value;
         associate a POST HTTP function call with the J2CA adapter's Create function call in response to the key information comprising the key value;
         associate a PUT HTTP function call with the J2CA adapter's Update function call in response to the key information comprising key value;
         associate a DELETE HTTP function call with the J2CA adapter's Delete function call in response to the key information comprising the key value;
      an execution module configured to invoke the J2CA adapter function call associated with the HTTP function, wherein the J2CA adapter executes the associated J2CA adapter function call on the one or more objects in the EIS having the object category and satisfying the key information; and
      a response module configured to receive from the J2CA adapter an SDO object and to translate the SDO object into an Atom-compliant XML (eXtensible Markup Language) response, wherein the response module further configured to communicate the Atom-compliant XML response to the Atom feed reader using the HTTP protocol;
   wherein the EIS configured to store data and respond to data operations requested by the J2CA adapter through adapter function calls.

6. The system of claim 5, wherein the response module is further configured to generate a plurality of URLs in response to receiving from the J2CA adapter a plurality of EIS objects, each URL comprising an HTTP GET function call to the servlet to retrieve a particular EIS object from the adapter, each URL further comprising a key value associated with a particular EIS object.

7. The system of claim 6, wherein the response module is further configured to translate the plurality of URLs into an Atom-compliant XML response and communicate the Atom-compliant XML response to the Atom feed reader.

8. The system of claim 5, wherein the response module is further configured to generate an Atom-compliant XML object in response to receiving from the adapter a single EIS object, the response module further configured to communicate the Atom-compliant XML object to the Atom feed reader.

* * * * *